April 21, 1959 — L. B. GRIFFITH — 2,883,060
HOOD CLOSED SLUDGE CHANNEL
Filed Dec. 10, 1956 — 3 Sheets-Sheet 1
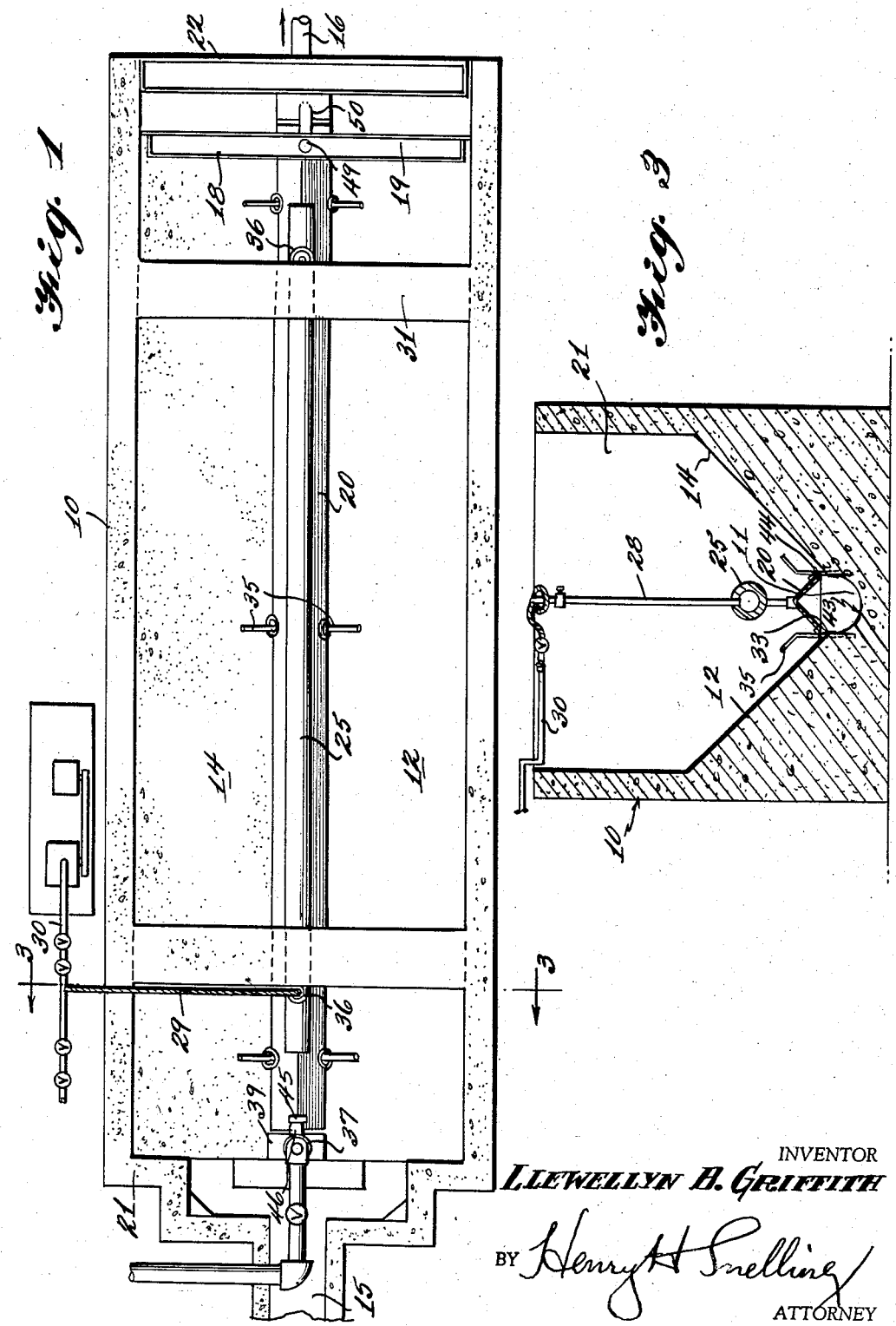
INVENTOR
LLEWELLYN B. GRIFFITH
BY Henry H. Snelling
ATTORNEY

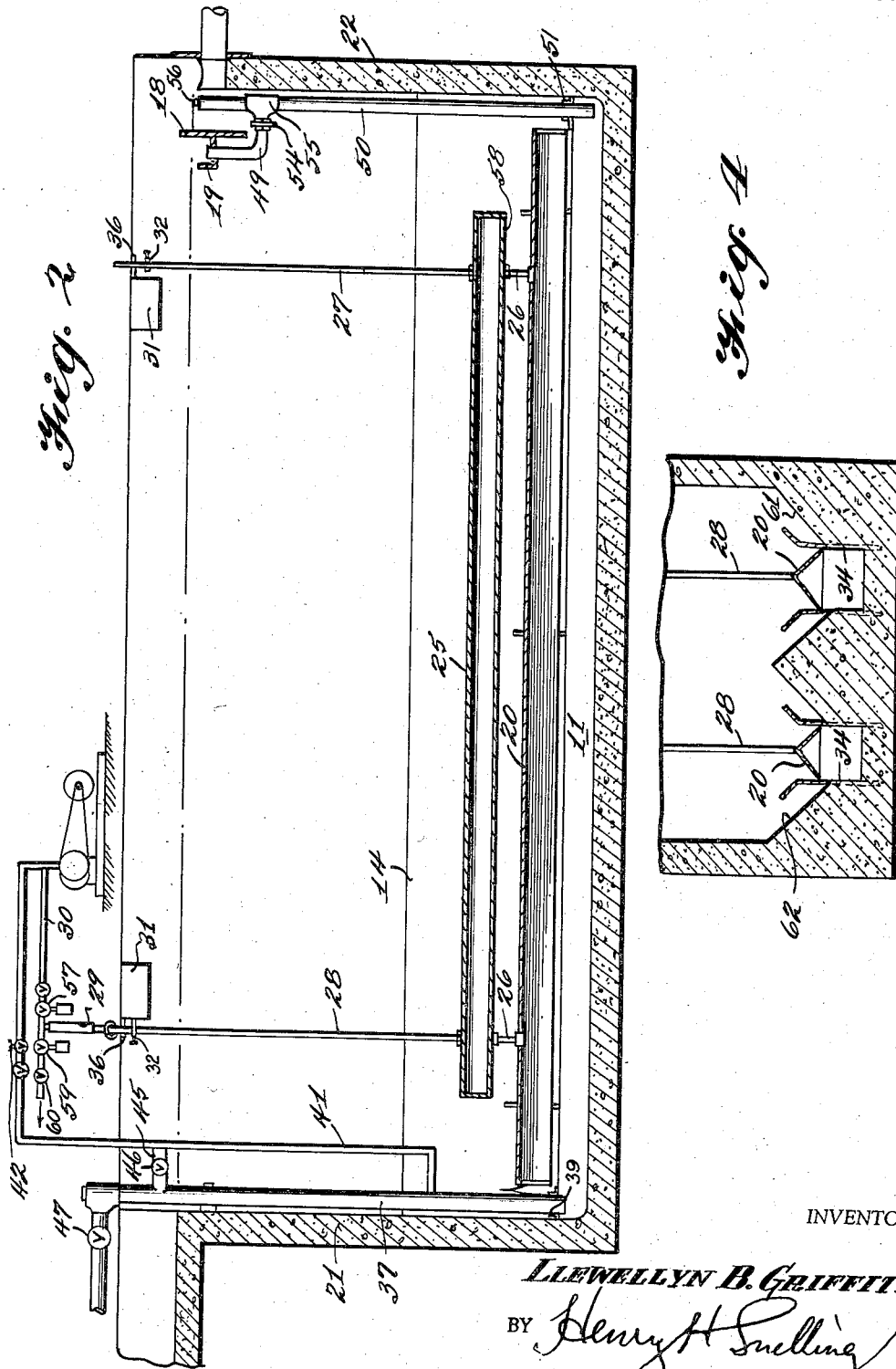

April 21, 1959

L. B. GRIFFITH 2,883,060

HOOD CLOSED SLUDGE CHANNEL

Filed Dec. 10, 1956

INVENTOR
LLEWELLYN B. GRIFFITH

BY Henry H. Snelling
ATTORNEY

United States Patent Office 2,883,060
Patented Apr. 21, 1959

2,883,060

HOOD CLOSED SLUDGE CHANNEL

Llewellyn B. Griffith, Arlington, Va.

Application December 10, 1956, Serial No. 627,159

12 Claims. (Cl. 210—532)

This invention relates to the removal of sludge from the bottom of a sewage tank and has for its principal object the provisions of means suitable for use in an initial, intermediate, or final settling tank to remove a quantity of sludge solids with a minimum amount of water, this being particularly desirable when the sludge is transferred from the tank to the digester, as an excess of water in the liquor sent to the digester causes a transfer from the digester into the system of a biologically strong discharge which is toxic to aerobic organisms in aerobic biochemical systems and consequently produces septic conditions under which the formation of carbon dioxide gas reduces greatly the quantity of organic solids and colloidal particles which will settle out.

A further object of the invention is to produce a substantially fool-proof tank which need never be dewatered for repair to the mechanism as all units of piping etc. are separately readily removable from the tank when the latter is filled, there being no need to by-pass or to pollute the stream receiving the effluent.

In the drawings:

Figure 1 is a plan view;

Figure 2 is a longitudinal vertical section;

Figure 3 is a transverse vertical section;

Figure 4 is a view similar to Figure 3 but showing a modification;

Figure 5:
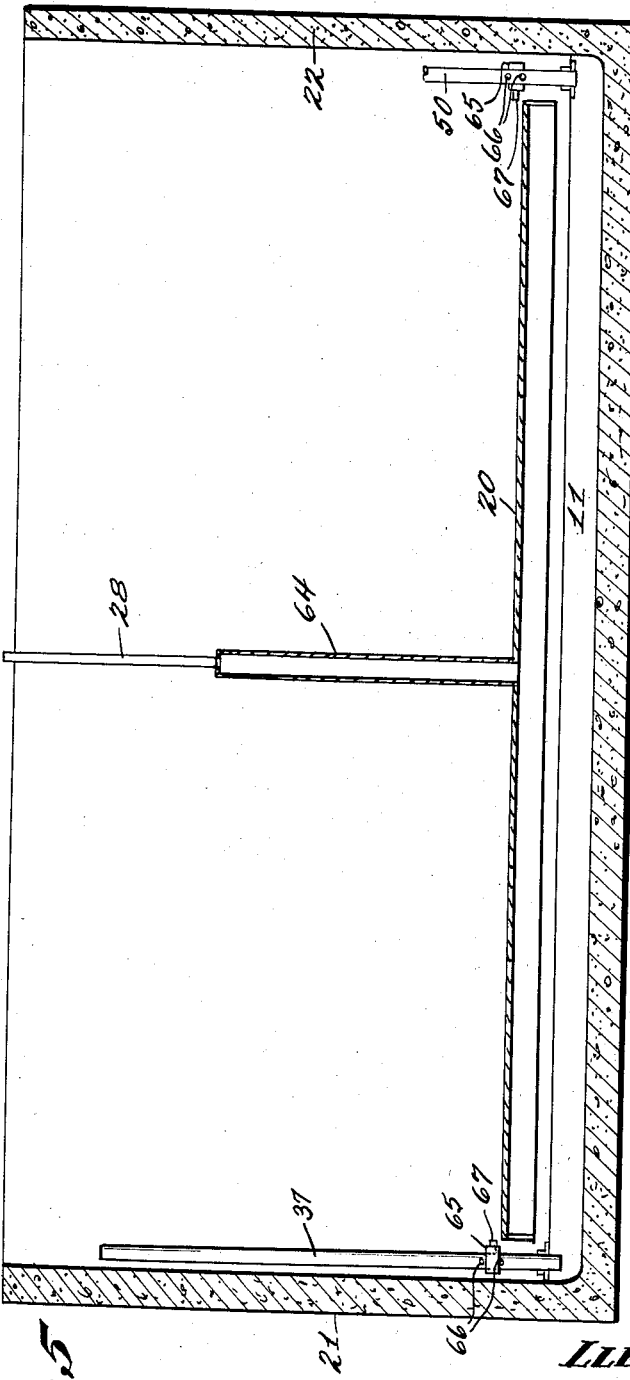
Figure 5 is a fragmentary view showing a modified form of float.
Figure 6:
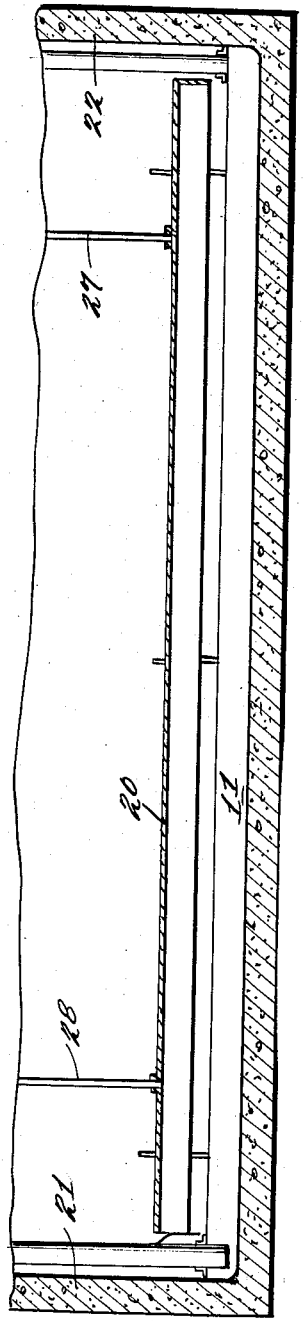
Figure 6 is a detail.

The tank 10 is shown as a rectangular tank having a longitudinal trough or channel 11 extending the entire length of the tank centrally between sloping walls 12 and 14 which deflect the falling solids into the trough which forms the lowest portion of the hopper bottom to the tank. The sewage enters at pipe 15 and leaves at pipe 16. A number of usual features of sewage tanks such as influent baffle, effluent wier, etc. are purposely omitted from the drawings in order to make them easier to read, and to emphasize the features of the invention. The scum baffle 18 is shown, however, with the usual scum trough 19.

A hood 20 closes the top of the trough 11 except for a small space near the front wall 21 and a similar space adjacent the rear wall 22. The hood 20 is raised and lowered by means of an elongated float 25 joined to the hood as by two or more connecting members 26 which may be rigid members such as rods. The float which may be a cylindrical aluminum tube of about 8″ diameter has at its top a pair of vertical guide members, one of which as 27 may be a rod but I prefer the other guide 28 to be a rigid pipe connected as by the flexible hose 29 to the main air pipe 30.

Both the pipe 28 and the rod 27 slide freely in guides or rings 36 detachably connected to the proximate removable cross-walk 31 and carry on the vertical member stop 32 adjustably set by a set screw so as to limit upward movement of the float and hood. Under ordinary circumstances the lift of the hood may be less than 3″.

Downward movement of the hood is limited by engagement with the sloping sides 12 and 14, my preference being that the width of the hood shall be slightly greater than the distance between the edge margins 33 at the junction of the sloping sides of the tank and the proximate short vertical sides 34 of the trough which may extend to a flat bottom as in Figure 4 but I prefer the bottom to be rounded as best seen at 43 in Figure 3. A series of curved bars 35 imbedded in the concrete of the tank proximate the trough or channel wall and spaced apart about ten feet guide the elongated hood into accurate position centrally above the channel, preferably engaging open rings 44 on the hood.

My preferred method of removing sludge from the trough or channel 11 is by an airlift. It is convenient to position a horizontal flat thin sheet metal plate 39 to receive loosely the lower end of the eduction pipe 37. This plate closes the space near the front wall 21 and also prevents lateral movement of the pipe 37 which is supported on the top of the tank wall.

The air pipe 41 to the airlift has a solenoid controlled valve 42 preferably controlled not by time but by the position of the hood 20. By this means the airlift may be made to operate after the hood has firmly seated but preferably the airlift starts operation slightly before the hood is all the way down, as in this manner I am able to clear material from the sloping sides 12 and 14 through the very narrow space between the sloping sides and the not yet seated hood 20. Where desired the hood may have its lowest position a half inch or so above its seat.

At times I desire to flush out the sand, gravel, etc. from the channel 11 and for this purpose I mount a short section of pipe 45 on the main airlift pipe 37 above the liquid level in the tank and have a manually controlled valve 46 in this short pipe. Consequently by closing the normally open valve 47 in eduction pipe 37 and opening the valve 46, a powerful stream can be discharged into the tank by the pipes 45 and 37 and the trough therefore will be thoroughly scoured out by such forced circulation without pumping any water at all into the sludge digester during this operation.

While the space between the rear wall 22 and the rear end of the hood may be left open, I prefer to join this space to the bottom of the scum trough 19 as by a generally horizontal pipe 49 and a vertical pipe 50, the latter engaging a horizontal plate 51 similar to the plate 39 and for approximately the same purpose. Pipe 50 carries the usual plug 56 so that the pipe 50 can readily be cleaned out when necessary without removing it. The horizontal portion of pipe 49 is joined to T 55 by a union 54 which can readily be disconnected to permit removal of pipe 50 as a unit together with its T, but leaving the scum trough and scum baffle both in place if desired.

The air pipe 30 is controlled generally by a time operated solenoid valve 57 which governs flow of air to the cylindrical float 25. The latter has a 2″ screened hole 58 at or near its bottom so that sewage liquid may flow in the float to replace any air withdrawn. The liquid flows out of the float as the liquid is expelled by the pressure of air when time control valve 57 is open. Time controlled solenoid valve 59 on the other side of hose 29 governs the time at which air is released from the float when valve 57 is closed and the simple valve 60 beyond this governs the rate at which air is discharged from the float, and consequently the speed of lowering of the hood 20 may be set at any chosen figure depending on the degree of closing of this valve. Since the cross-walks 31 are readily removable it will be noted that all portions of the mechanism can readily be removed vertically upward upon uncoupling the union 54 as the air pump assembly with its valve and pipe can be raised directly, there being no obstruction to such movement. The float and its hood can be removed from the tank with the cross-walks 31 and their adjustable guides 36 as the float will then rise to the surface of the liquid.

At as frequent intervals as may be desired the time controlled valve 57 closes and valve 59 opens, releasing air from the float 25 as fast or as slow as permitted by the setting of regulator valve 60. The sewage flows in the float through the entry 58 and the hood sinks to its seat or just above it depending on the time the valve 57 again opens which is set accordingly. The airlift starts and stops automatically, being controlled by the position of the hood. The scum and sludge are removed simultaneously when pipe 50 is used, whether optional plate 51 is present or not.

In Figure 4 the invention is shown with multiple sludge troughs 61 and 62, which are often necessary, with wide tanks in order to conserve the cost of the concrete and also where it is desired to use a more shallow depth tank. The hood 20 in Figure 4 is the same as in the other figures and differs only in that the pipes 28 (and also the rods 27) extend directly to the hood rather than to the float which in this figure is shown as omitted.

In Figure 5 the hood 20 carries a float 64 which in this case is vertical and is preferably a tube of 8″ or 10″ diameter, usually of plastic. In this figure the airpipe 28 discharges directly into the vertical float. In such a construction it is necessary to latch the hood in lowered position. This is readily accomplished by mounting a catch of any kind on the pipes 37 and 50. In the simple form illustrated, a collar 65, loosely mounted on the pipes and held by stops 66, is free to rotate but cannot move axially. This collar 65 carries a radially projecting pin 67 which, when the collar 65 is rotated in the proper direction, and to the position shown serves as a stop to keep the hood 20 from rising. These pins 67 can readily be reached from the surface by a long rod and knocked 90° to proper position to free the hood from the surface. Where rags and other clogging substances may be expected, the size of the hole 58 can be greatly enlarged; in fact, in one installation I have made the slot 3″ wide and had it run practically the entire length of the float. With such an elongated slot there is no danger of clogging.

What I claim is:

1. In combination, a sewage tank having two sloping bottom surfaces leading to a trough between the surfaces, a hood movable downwardly to form a roof for the major length of the trough so as to leave a space at the rear of the tank for entry of liquid into the trough and leave a space between the hood and the entry end of the tank for removal of sludge, means at said entry end for drawing sludge from the trough, and means for elevating the hood.

2. The combination of claim 1 in which the sludge drawing means includes means for selectively withdrawing the sludge from the tank, and circulating the sludge in the tank to scour out the trough.

3. The combination of claim 2 in which the selective means includes an air lift having a sludge intake from the trough at said entry end of the tank.

4. The combination of claim 1 with a scum trough, and piping leading from the scum tank to the space at said rear end of the tank, whereby when the sludge is drawn from the trough scum will be drawn into the trough.

5. The combination of claim 4 in which the piping includes a vertical pipe, a horizontal pipe, a plate at right angles to the vertical pipe to close the space above the trough between the end of the hood and the proximate end wall of the tank, a T joining the horizontal and vertical pipes and having a clean-out plug, and a union in the horizontal pipe for ready disconnection of the vertical pipe from the piping extending from the scum trough to the union.

6. A sewage tank having opposed bottom surfaces leading to a sludge trough between the surfaces, an elongated hood shorter than the trough, a float attached to the hood and having an exit opening whereby the float can be filled with sewage liquid and thereby lower the hood to form a ceiling for the trough, means to expel the liquid from the float and fill the float with air to an extent to raise the hood above the bottom edges of the sloping surfaces, and means to leak air from the float.

7. The tank of claim 6 in which the float is parallel to the hood and directly above the trough.

8. The tank of claim 7 in which the float is cylindrical and the exit opening is at the bottom of the cylinder.

9. The tank of claim 8 with guide means to limit the elevation of the hood above the trough.

10. The tank of claim 9 in which the guide means includes adjustable stops above the float and rigid vertical guides engaging the hood to insure registry of the sides of the hood with the margins between the sloping surfaces and the proximate side walls of the trough.

11. The tank of claim 6 in which the means are independently time-controlled and each includes a solenoid operated valve in an air line leading to the float.

12. In combination, a sewage tank having a sludge trough receiving settling solids from a sloping bottom of the tank, a scum trough proximate the exit end of the tank, a pipe leading from the bottom of the scum trough, a scum removal unit separably connected to said pipe and including piping discharging into the sludge trough of the tank, a hood unit for closing the sludge trough to form a sludge passageway, and a sludge removal unit for withdrawing sludge and scum through the sludge trough and from the tank, each of said units being separately and independently removable vertically from the tank whereby any portion of the system can be removed for repair without dewatering the tank.

References Cited in the file of this patent

UNITED STATES PATENTS

| | | |
|---|---|---|
| 1,069,040 | Steuer | July 29, 1913 |
| 1,077,476 | Kaibel | Nov. 4, 1913 |
| 1,135,080 | Vandercook | Apr. 13, 1915 |
| 1,774,275 | Johnson | Aug. 26, 1930 |
| 2,173,932 | Buckley | Sept. 26, 1939 |
| 2,267,608 | Hawley | Dec. 23, 1941 |
| 2,430,519 | Mallory | Nov. 11, 1947 |
| 2,439,866 | Saladin | Apr. 20, 1948 |
| 2,545,425 | Fischer | Mar. 13, 1951 |
| 2,551,334 | Parks | May 1, 1951 |
| 2,556,771 | Moore | June 12, 1951 |
| 2,732,944 | Hays | Jan. 31, 1956 |